(12) United States Patent
Hetzner et al.

(10) Patent No.: US 8,167,603 B2
(45) Date of Patent: May 1, 2012

(54) DEVICE FOR THE PRODUCTION OF CORRUGATED PIPES

(75) Inventors: Claus Hetzner, Zirndorf (DE); Michael Hurler, Roegling (DE)

(73) Assignee: Drossbach GmbH & Co. KG (DE)

( * ) Notice: Subject to any disclaimer, the term of this patent is extended or adjusted under 35 U.S.C. 154(b) by 902 days.

(21) Appl. No.: 11/573,739

(22) PCT Filed: Aug. 10, 2005

(86) PCT No.: PCT/EP2005/008687
§ 371 (c)(1),
(2), (4) Date: Dec. 6, 2007

(87) PCT Pub. No.: WO2006/018207
PCT Pub. Date: Feb. 23, 2006

(65) Prior Publication Data
US 2008/0118596 A1 May 22, 2008

(30) Foreign Application Priority Data
Aug. 18, 2004 (DE) .......................... 10 2004 040 019

(51) Int. Cl.
*B29C 47/90* (2006.01)
(52) U.S. Cl. .................. 425/233; 425/326.1; 425/336; 425/369; 425/392; 425/396
(58) Field of Classification Search .................. 425/233, 425/326.1, 336, 369, 388, 392, 396
See application file for complete search history.

(56) References Cited

U.S. PATENT DOCUMENTS

| | | | | |
|---|---|---|---|---|
| 3,776,679 A | * | 12/1973 | Hegler | 425/532 |
| 4,212,618 A | * | 7/1980 | Hegler et al. | 425/326.1 |
| 4,365,948 A | * | 12/1982 | Chaplain | 425/417 |
| 4,787,598 A | | 11/1988 | Rahn et al. | |
| 5,522,718 A | * | 6/1996 | Dietrich | 425/325 |
| 5,693,347 A | * | 12/1997 | Hegler | 425/233 |
| 5,773,044 A | * | 6/1998 | Dietrich et al. | 425/370 |

(Continued)

FOREIGN PATENT DOCUMENTS

CN 1050801 C 3/2000

(Continued)

*Primary Examiner* — Yogendra Gupta
*Assistant Examiner* — Joseph Leyson
(74) *Attorney, Agent, or Firm* — St. Onge Steward Johnston & Reens LLC

(57) ABSTRACT

The invention under consideration concerns a device for the production of corrugated pipes made of thermoplastic, in which mold jaws, which complement each other in pairs, are conducted jointly in a cycle along a mold section that leads away from an extruder head; they are moved apart at the end of the mold section and are returned to its beginning separately from one another with a mold section device for the movement of the mold jaws along the mold section, which has a supporting table with drive means for the mold jaws on the mold section, and with a return conveying device for the return conveyance of the mold jaws from the end of the mold section to its beginning, which has an outlet assembly to move apart the mold jaws at the end of the mold section and/or an inlet assembly to move in the mold jaws at the beginning of the mold section. In accordance with the invention, the outlet assembly and/or the inlet assembly have drive means, which can be moved perpendicularly with reference to the plane of the supporting table.

19 Claims, 12 Drawing Sheets

U.S. PATENT DOCUMENTS

| | | |
|---|---|---|
| 7,118,369 B2 | 10/2006 | Dietrich et al. |
| 2002/0125609 A1* | 9/2002 | Hegler .................. 264/209.1 |

FOREIGN PATENT DOCUMENTS

| | | |
|---|---|---|
| CN | 1383975 A | 12/2002 |
| DE | 43 18 514 | 8/1994 |
| DE | 43 38 990 | 2/1995 |
| DE | 197 02 647 C1 | 2/1998 |
| DE | 692 22 188 T2 | 3/1998 |
| DE | 199 47 434 A1 | 3/2001 |
| DE | 201 04 922 U1 | 7/2002 |
| DE | 10 148 294 | 1/2003 |
| EP | 00 07 556 | 2/1980 |
| EP | 0636462 A | 2/1995 |
| EP | 07 64 516 | 3/1997 |
| EP | 12 43 400 | 9/2002 |
| EP | 1407873 A | 4/2004 |
| JP | 02134227 A | 5/1990 |
| WO | WO 94/07673 | 4/1994 |
| WO | 01/12413 | 2/2001 |

* cited by examiner

DEVICE FOR THE PRODUCTION OF CORRUGATED PIPES

CROSS-REFERENCE TO RELATED APPLICATIONS

This application is a US national stage under 35 U.S.C. §371 of PCT/EP2005/008687 filed Aug. 10, 2005, which in turn claims priority to German application number 102004040019.9 filed Aug. 18, 2004. These applications are herein incorporated by reference.

TECHNICAL FIELD

This invention relates to a device for the production of corrugated pipes from thermoplastic.

BACKGROUND

The invention under consideration concerns a device for the production of corrugated pipes from thermoplastic, in which supplementary mold jaws, in pairs, are jointly conducted in a cycle along a mold section leading away from an extruder head; they are moved apart at the end of the mold section; and they are returned to their beginning separately from one another with a mold section device to move the mold jaws along the mold section, which has a supporting table with drive means for the mold jaws on the mold section, and with a return conveyance to return the mold jaws from the end of the mold section to its beginning, which has an outlet assembly to move apart the mold jaws at the end of the mold section and/or an inlet assembly to move in the mold jaws at the beginning of the mold section.

With those corrugated pipe units of the so-called shuttle type, return conveyors that move back and forth are used. The return conveyors can have a gripping arm, which grips a mold jaw, found at the end of the mold section, moves to the beginning of the mold section, puts down the mold jaw there, and joins or attaches it to the mold jaw that is moving in front, and subsequently again moves to the end of the mold section so as to grip there the next mold jaw. On the mold section itself, the mold jaws are moved on by separate drives, which, on the one hand, lie on the supporting table, and on the other hand, are located on the cover frame lying above. In particular, the provision of drive pinions in the supporting table and in the cover frame lying above is known; they mesh in the toothed racks located on the mold jaws, above and below, and move them correspondingly forwards.

EP-A-0 764 516 discloses a device for the production of pipes from thermoplastic with transverse profiling, which has mold jaws in pairs conducted in a cycle on a mold section. A transporting device for the return of the mold jaws is provided, and is designed like a bridge crane. Two transport conveyances, which can be moved transverse to the production direction and in directions opposite one another, are provided on the transport bridge that overlaps the mold section; a transport arm, directed downwards and with a holding device, is affixed on these conveyances, one for each mold jaw.

From WO-A-94 07673, also, a corrugated pipe unit is known in which the pair of mold jaws are comprised in two groups. A first group is supported on a carriage that can be moved back and forth on a lower carrying frame. A second group of mold jaws is supported on a carriage that can be moved back and forth on an upper carrying frame of a bridge crane. The mold jaws can be brought together or moved apart on trolleys. In order to move back the mold jaws, they are first moved apart on the trolleys; then the carriage with the moved-apart mold jaws is moved back past the mold jaws of the other carriage, to the beginning of the mold section, and finally the mold jaws are again brought together on the carriage.

DE-A-43 18 514 discloses a device for the production of corrugated pipes from thermoplastic, which device has a mold section leading away from the head of an extruder consisting of a guide located in a frame on which mold jaws, closed in pairs to form annular molds in an inlet, are moved in close succession, which mold jaws are provided on their underside with, toothed, racks. In an outlet, the mold jaws are separated from one another and grasped by gripping arms provided with coupling devices and are inserted by them, once again, into the inlet of the mold section. The gripping arms are supported by drives that are movable on carriages, which can be moved by drives back and forth on guides to and from return sections that are parallel to the mold section. In order to be able to control the gripping arms with a simple and stable structure and in a simple manner, they can be moved in guides of the carriage exclusively transverse to their path of movement.

DE-A-43 38 990 discloses a device for the production of corrugated pipes from thermoplastic, which device has a mold section leading away from an extruder head that consists of a guide located in a frame on which mold jaws, closed in pairs to form annular molds in an inlet, are moved in close succession, which mold jaws are provided on their underside with toothed racks. Drives, which mesh with the toothed racks of the mold jaws, moved together, are placed in the beginning area of the mold section. In an outlet following the mold section, the mold jaws are separated from one another and then are conducted back to the inlet of the mold section via conveyors.

EP-A-0 007 556 discloses a device for the production of pipes from thermoplastic with transverse profiling, which device has mold jaws, in pairs, conducted in a cycle on a mold section. So as to need only the smallest possible total number of mold jaws conducted, in the cycle, a carriage is provided with a swiveling arm on whose free end a coupling element for the detachable coupling to a mold jaw is located.

EP-A-1 243 400 discloses a device for the production of pipes from thermoplastic with transverse profiling, which device has mold jaws, in pairs, conducted in a cycle on a mold section. The return conveying device consists of a portal robot, which moves out the mold jaws from the mold section, returns them to the upstream end of the mold section and again moves them into the mold section. The attachment to the respective mold jaw which is moving in front, however, is brought about by pneumatic cylinders working separately from the portal robot, as a component of the return conveying device.

EP-B-0 636 462 discloses a device for the production of pipes from thermoplastic with transverse profiling, which device has mold jackets, in pairs, conducted in a cycle on a mold section. The return conveying device is formed by a return section in which a large number of drive pinions are provided, which mesh into the mold jaws from below. For the movement out of the mold section, on the downstream end, and for the movement into the mold section on the upstream end, an outlet and an inlet assembly are provided as a component of the return section, wherein the transverse conveyance of the mold jaws takes place by means of pinions driven in a transverse movement. These transverse conveying pinions drive the mold jaw to be conveyed, on the one hand, in the production direction. On the other hand, the transverse conveying pinions are supported on spline shafts in a way so that they can be displaced axially; thus the transverse conveying pinions can also be driven in their axial direction, in order to move the mold jaw to be conveyed into and out of the mold section.

SUMMARY

The goal of the invention under consideration is to create an improved corrugated pipe unit, in which the return of the mold jaws from the downstream end to the upstream end is optimized. In particular, the return conveying device is designed in such a manner that the return of the mold jaws is improved with respect to both time and dynamics. In the end result, it should also be possible to increase the rate of production of the corrugated tubes.

This goal is attained by a device for the production of corrugated pipes in accordance with the present invention.

In accordance with the invention, the outlet assembly and/or the inlet assembly have drive means, which can be moved perpendicularly with reference to the plane of the supporting table. The moving ability in the perpendicular direction is not to be understood in a strictly geometric sense; it can also be a movement component present in a direction parallel to the plane of the supporting table, especially as in the case of a swivel movement. The term "mold jaw" is to be understood below to be, in particular, a mold half, which together with an interacting mold half forms a closed mold area for the production of a corrugated pipe.

The inlet group is used to move the mold jaws into the mold section and, perhaps also to attach the mold jaws to the mold jaw moving ahead in the production direction. The attachment, however, can also be carried out by a separate drive, in particular, by pneumatic cylinders. The mold jaws on the mold section are driven by drive means in the beginning area of the mold section in the production direction, so that the upstream mold jaws are driven by these drive means and, in this way, all mold jaws moving ahead are driven forwards by pressure action in the production direction. Usually, one or more drive pinions are used for this; they mesh into toothed racks from below through a recess in the supporting table. Furthermore, upper drive pinions are provided, so as to attain the most uniform drive possible.

If an inlet assembly has moved a mold jaw into the mold section, then the drive means, which comprises, for example, transverse conveying pinions, can be moved once again transversely and outwards so as to accept the next mold jaw according to the state of the art only if the attachment with a meshing of the drive means of the mold section device has taken place, and furthermore, the mold jaw was further conveyed by these drive means in such a way that it is no longer meshed with the drive means of the inlet assembly. That means that the affected mold jaws must have completely left the meshing area of the drive means of the inlet assembly before this drive means can again be moved transversely and outwards.

In accordance with the invention, a more efficient procedure of the inlet assembly is attained, in that the drive means of the inlet assembly can be moved perpendicularly with reference to the plane of the supporting table. If the affected mold jaw was meshed with the drive means of the mold section device, the drive means of the inlet assembly can be immediately lowered, so as to mesh with the mold jaw. In this way, it is possible to move the drive means of the inlet assembly transversely and outwards, although the mold jaw is still located at least partially above the drive means of the inlet assembly.

The rate of production of the mold jaws in the mold section is relatively slow in comparison to the return velocity. Thus, it is clear that the gain in time with the inventive measure, with reference to the time span for the entire return according to the state of the art, is considerable since the disengagement of the drive means of the inlet assembly in comparison to the attached mold jaw, which is driven forwards at the clearly slower rate of production, no longer has to be awaited. The result is that it is also possible to increase the rate of production since the mold jaws can be returned more rapidly and more efficiently.

Furthermore, the inventive measure makes it possible for there to be more than one mold jaw per side on the return section. Thus, the drive means of the inlet assembly can do more than just produce a more rapid outward movement. It is also possible by means of the inventive measure for the next mold jaw, which was not yet moved into the mold section, to be on the (outer) upstream end without it having to be gripped by the drive means of the inlet assembly. The drive means of the inlet assembly can be meshed with the mold jaw, namely, from below and do not have to be already in their outer position in order to accept the next mold jaw if said jaw is still being moved against the production direction by the return conveying device.

In accordance with the invention, it is also possible, alternatively or cumulatively, to provide the moving ability of the drive means perpendicularly with reference to the plane of the supporting table with the outlet assembly. The aforementioned advantages are there correspondingly attained also. The drive means of the outlet group need not already be moved inwards toward the mold section in order to accept a mold jaw at the end of the mold section. Rather, the mold jaw can already be located at the end of the mold section, where, if necessary, it is released from the corrugated pipe by a V-shaped guide, wherein the drive means of the outlet assembly are then moved from below the mold jaw upwards, so as to mesh with the individual mold jaw.

After the drive means of the outlet assembly have been moved apart, there is a gain in time since the drive means can be moved downwards and then, once again, inwards, as soon as the first drive pinion of the lateral return section has grasped the mold jaw, in that a pinion return is provided, in the return section against the production direction. In case of a return by a portal robot or crane against the production direction, the drive pinions of the outlet assembly can be lowered and then once again be driven inwards to the mold section, so as to grasp the next mold jaw before the portal robot or the crane has grasped the mold jaw that was moved outwards and has conveyed it further.

According to another aspect of the invention under consideration, a mold jaw for the production of pipes with a first outside diameter is connected to at least one height adapter. In this way, a height compensation can be created if the mold jaw is used in a device for the production of corrugated pipes, which device is constructed for mold jaws for a second diameter, which is larger than the first diameter, without having to undertake a height adjustment of the device for the production of corrugated pipes, in particular, the cover frame of the device. Furthermore, the mold jaws in accordance with the invention, which are first provided for devices for the production of pipes of a smaller construction size, can be used universally, namely, for devices for the production of pipes of a larger construction size also.

The height adapter of the mold jaw in accordance with the invention advantageously has a profile insert that is suitable for working together with drive means of the mold section device of the device for the production of corrugated pipes, wherein the profile insert has at least one toothed rack that works together with a pinion of the mold section device. In this way, it is possible for the height adapter to be produced of light metal, in particular, aluminum, and for the profile insert to be made of steel.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
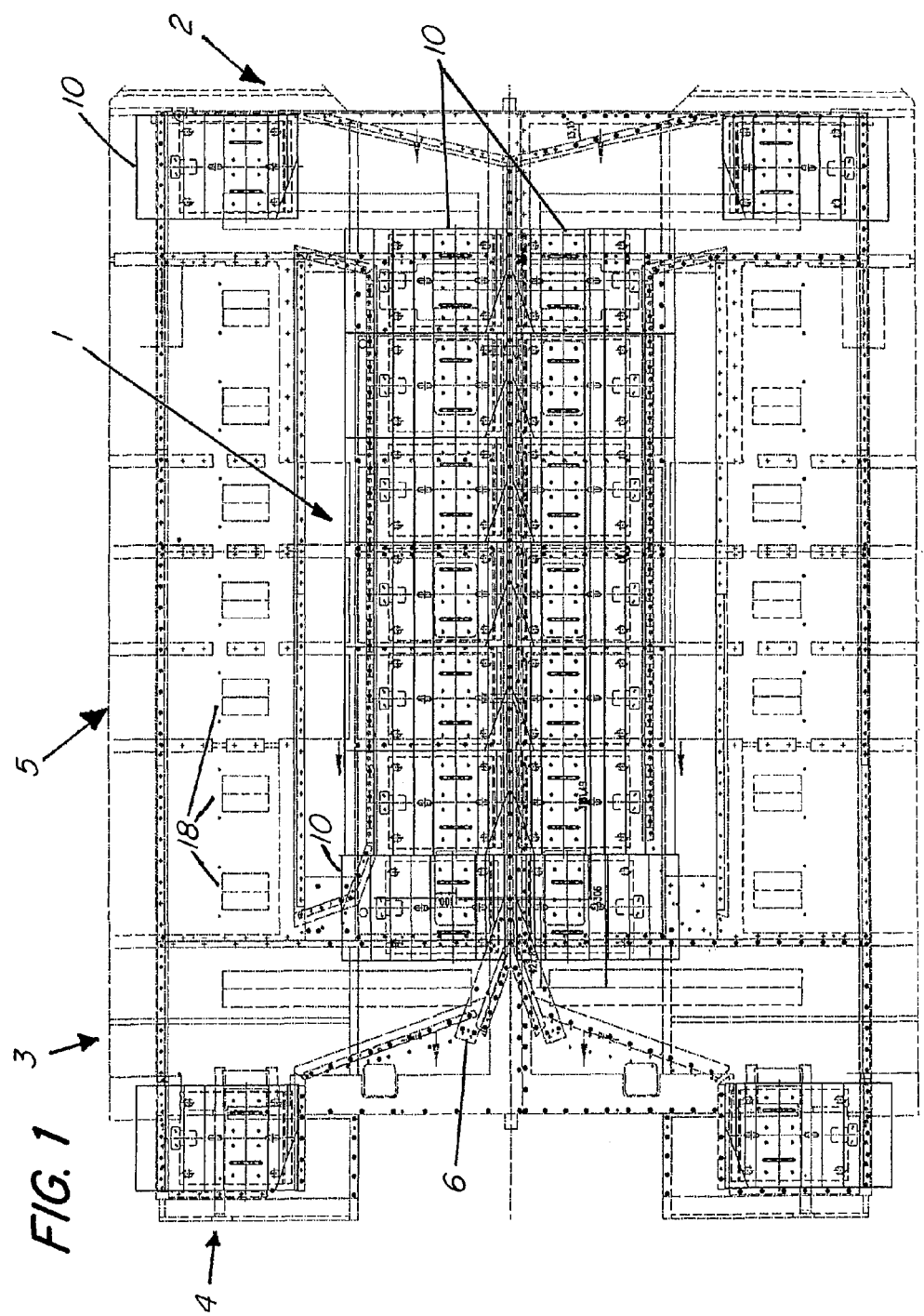
FIG. 1 shows a schematic top view of a device according to a first embodiment example of the invention under consideration.
Figure 2:
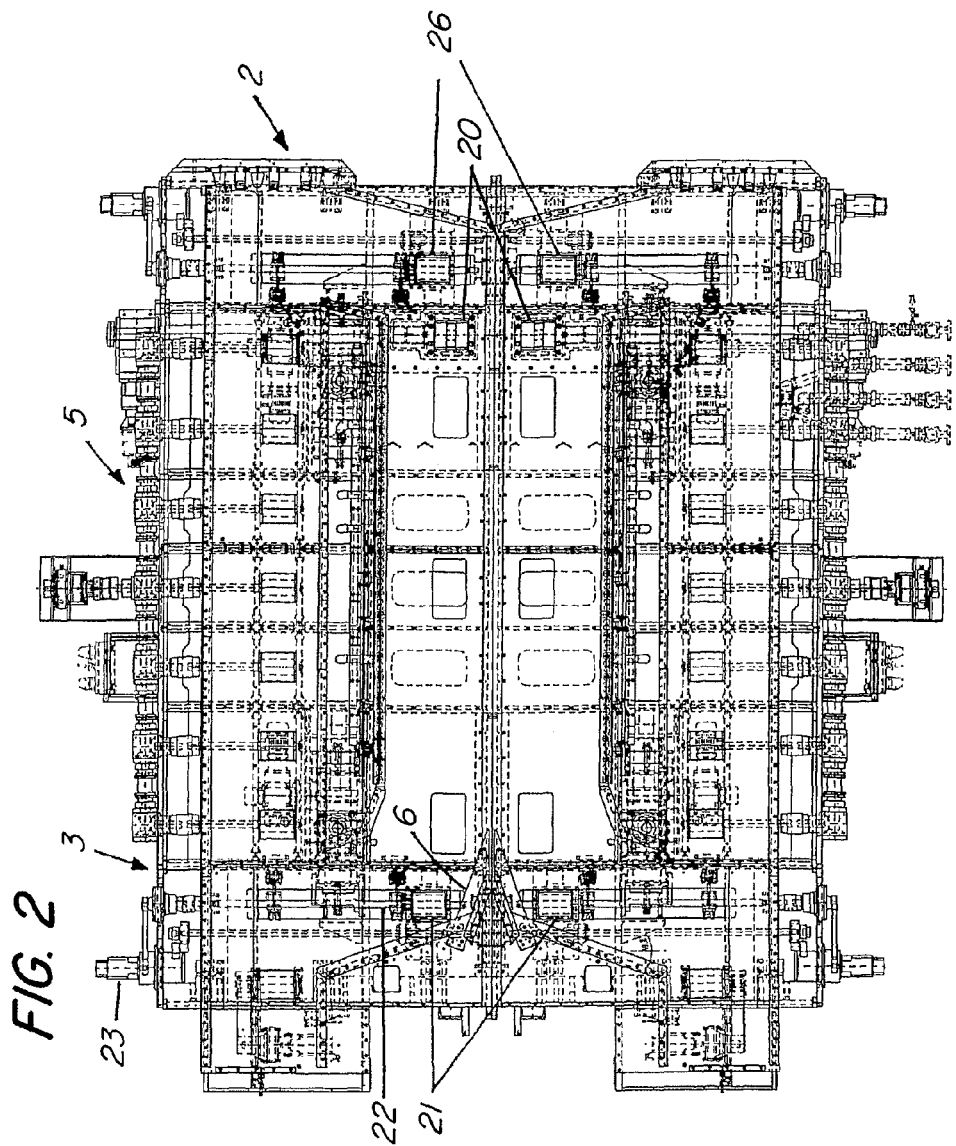
FIG. 2 shows another detailed top view of the device according to the first embodiment example of the invention under consideration.

FIGS. 1 and 2 show a schematic and a detailed top view of a device according to a first embodiment example of the invention under consideration. On a mold section 1, a large number of mold jaws 10 on two sides are moved in the production direction for the production of a corrugated pipe (in FIGS. 1 and 2 from right to left), which complement each other, in pairs, to form a closed mold. The extruder head to inject thermoplastic at the beginning of the mold jaw is not depicted in FIGS. 1 and 2. Two drive pinions 20 (see FIG. 2), are located at the beginning of the mold section 1; they drive all the mold jaws 10 on a supporting table 19 (see FIG. 4) of the mold section 1. There is a V-shaped prism guide 6 at the end of the mold section, which releases the last mold jaws 10, on the mold section 1, from the (not depicted) corrugated pipe—that is, moves them apart laterally. An outlet assembly 3 is located at the end of the mold section; it moves the mold jaws 10 laterally further out of the mold section and at the same time moves them in the production direction, so as to avoid jamming with the following mold jaw.

According to the embodiment example, the outlet assembly 3 has a pinion 21 on both sides, which is supported on a spline shaft 22 to transfer the rotary movement of a motor 23 (see FIG. 2), so as to move a mold jaw 10 to be conveyed during the transverse movement further in the production direction. The pinion 21 is also supported in a carriage 24 (see FIG. 6), which can be moved together with the pinion 21 via a driven spindle transverse to the production direction. A superimposed movement of the mold jaw to be conveyed 10 can be produced by the outlet assembly 3 in this manner, so that the mold jaw 10 can be moved from the mold section 1 at an incline.

After moving out a mold jaw 10, the pinion 21 is driven in the opposite direction, so as to transfer the mold jaw 10 to a return section 5, which, in turn, has driven drive pinions 18 for returning the mold jaws 10 counter to the production direction.

After the return section 5, the mold jaw 10 to be returned is transferred to an inlet assembly 2, which also has transversely moved pinions 26—corresponding to the construction of the outlet assembly 3. The transversely moved pinions 26 accept the mold jaws 10 from the return section 5 and move the mold jaws 10 into the mold section 1, slightly at an incline, in the production direction by rotation and simultaneous transverse movement. After moving them into the mold section, the pinions 26 drive the moved-in mold jaws 10 further in the production direction in order to bring them into contact with the mold jaws that were moved forward and to engage them with the drive pinions 20 of the mold section device. However, the attachment can also result through a separate driving means, in particular through pneumatic cylinders.

FIG. 1 also shows park stations 4 for the intermediate storage of mold jaws, in particular, special mold jaws, to form a sleeve. If a sleeve is to be formed on the corrugated pipe, the special mold jaws are brought into the mold section cycle, wherein another mold jaw pair is placed in storage in the park stations 4 during a rotation of the special mold jaws. Afterwards, this mold jaw pair is again brought into the cycle, and the special mold jaws are again moved pack to the park stations 4.

Figure 6:
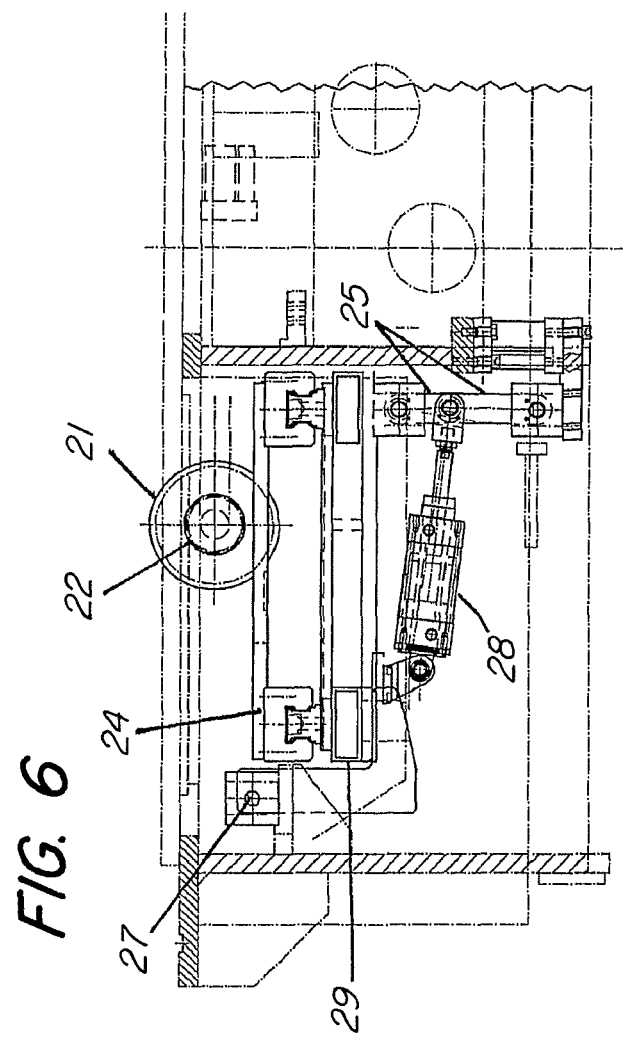
FIG. 6 shows a tilting mechanism according to an embodiment example of the invention under consideration, to lower the drive means of the inlet or outlet group in its upper position.
Figure 7:
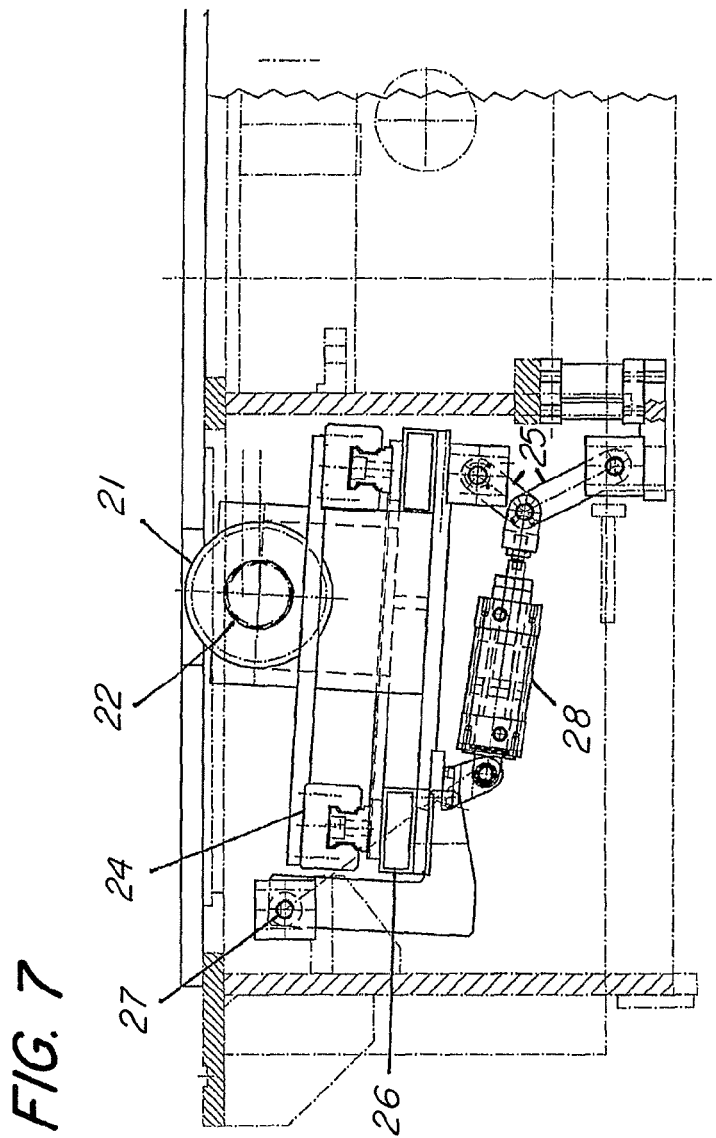
FIG. 7 shows a tilting mechanism according to an embodiment example of the invention under consideration, to lower the drive means of the inlet or outlet group in its lower position.

According to the first embodiment example, the transverse conveyance pinions 21 and 26 of the outlet and inlet assemblies 3, 2 cars be moved perpendicularly in accordance with the invention with reference to the plane of the supporting table 19. To this end, a swivel mechanism is provided, which is shown in FIGS. 6 and 7. The pinion 21 is supported on the spline shaft 22, so as to make possible the transfer of the rotary drive, and on the carriage 24, so at to make possible the transverse movement. The carriage 24 is supported by a holder or a frame 29, which has a knee lever mechanism 25. In the area of the knee of the knee lever mechanism 25, a pneumatic cylinder 28 goes into action, so as to actuate the knee lever mechanism 25.

FIG. 6 shows the pinion 21 in its upper position, wherein the knee lever mechanism 25 is stretched. FIG. 7 shows the pinion 21 in its lower position, wherein the knee lever mechanism 25 is bent. By means of this perpendicular adjustment possibility perpendicular to the plane of the supporting table 19, it is possible to bring about a transverse displacement of the pinion 21 in its lowered position—even if a mold jaw 10 is situated above the pinion 21. Therefore, the pinion 21 need not have already been moved inwards to the mold section 1 so as to accept a mold jaw 10 from the mold section 1. Rather, this mold jaw 10 can already be released from the corrugated pipe by the V-shaped prism guide 6, wherein only subsequently can the pinion 21 mesh from below into a toothed rack of the mold jaw 10, which is located on the underside of the mold jaw, by actuating the knee lever mechanism 25. Thus, a considerable gain in time is attained, and the pinion 21 can also be used to further convey the mold jaw 10 moving ahead in the time period before meshing into the mold jaw 10.

The same advantage is produced during the transfer of the mold jaw 10 to the pinion return section 5 since the pinion 21 can be immediately lowered after transfer of the mold jaw 10 to the first pinion of the pinion return section 5, so as to once again, move it inwards to the mold section.

By actuation of the knee lever mechanism 25, a swivel movement of the frame 29 around an axis 27 is attained. It is advantageous thereby that the rotation axis of the motor 23 (see FIG. 1) for the rotation of the transverse conveyance pinions and/or the rotation axis of the motor for transverse displacement of the transverse conveyance pinions coincide with the rotation axis of the holder or the frame. By means of this measure, the drive or the force transfer to the pinion 21 is not influenced disadvantageous by the swivel movement.

The means for the lowering of the pinion 21 are not limited to a knee lever mechanism 25 according to the invention under consideration. Rather, according to other embodiment examples, it is also possible to use a scissors-type lever mechanism or a parallelogram lever mechanism.

The advantages described above also exist with the inlet assembly 2. If a pair of mold jaws 10 of the inlet assembly 2 were meshed with the pinions 20 of the mold section device, the pinions 26 of the inlet group 2 are immediately lowered in order to disengage from the mold jaws 10. In this way, the pinions 26 of the inlet assembly 2 are moved transversely outwards, although the mold jaws 10 are still situated at least partially above the pinions 26 of the inlet assembly.

The production rate according to the first embodiment example can be 4 m/min, wherein eight mold jaw pairs with an axial length of 500 mm can be in circulation. The time available for the return of a mold jaw 10 is thus 7.5 s in order to guarantee a gap-free return. If then the control for the drive of the pinion 26 would have to await a movement of the mold jaw 10 in the production direction of, for example, 100 mm, this would mean a time loss of 1.5 s, which represents a time loss of 20% in proportion to the total cycle of 7.5 s. By this gain in time, which is given, with each transfer operation of the inlet and outlet assemblies, the rate of production can be increased as a result since the mold jaws can be returned more rapidly and efficiently.

Figure 11:
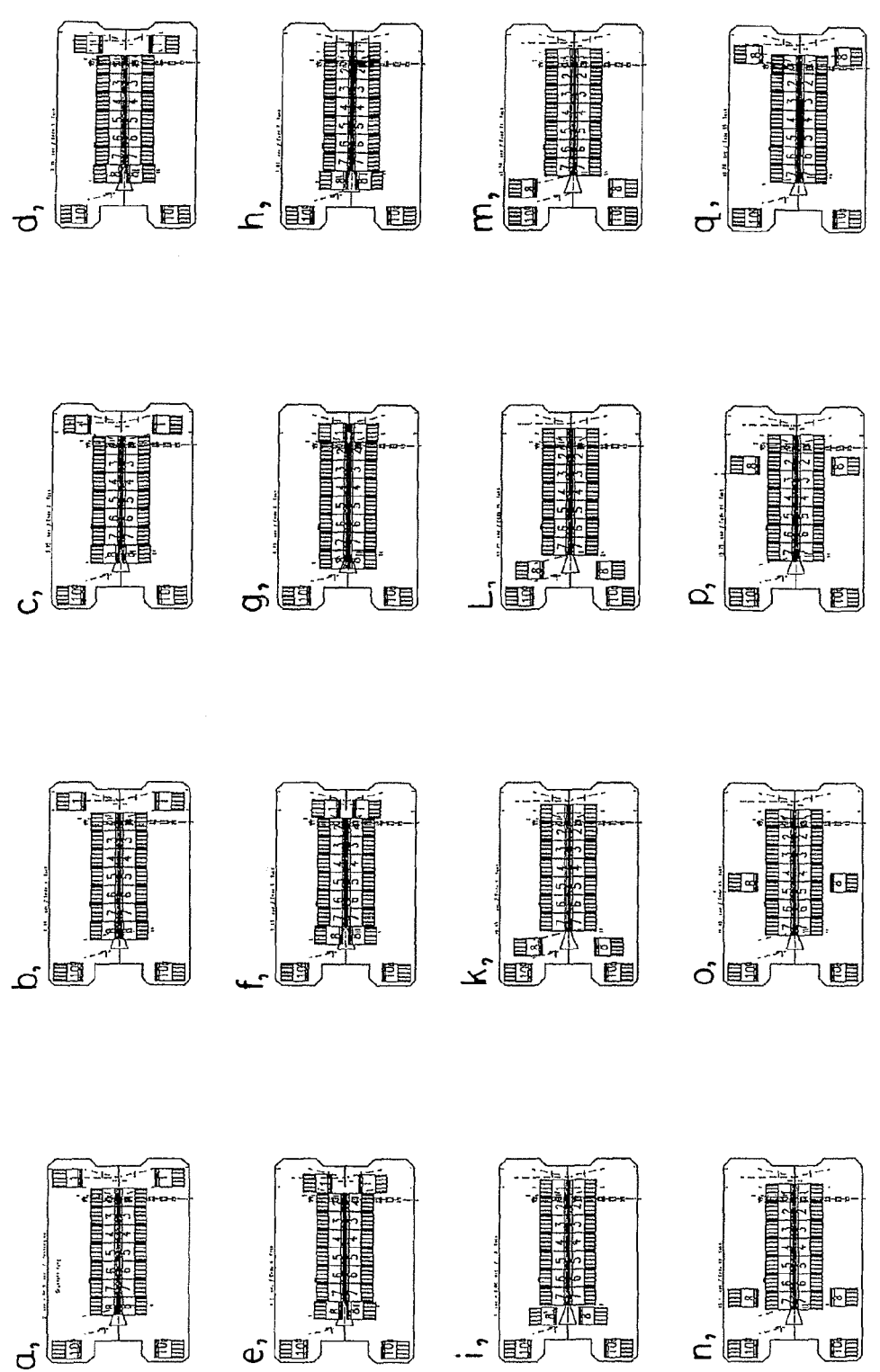
FIG. 11 shows a flow chart for the operation of a device according to an embodiment example of the invention under consideration, wherein eight mold jaws on each side are in rotation.
Figure 12:
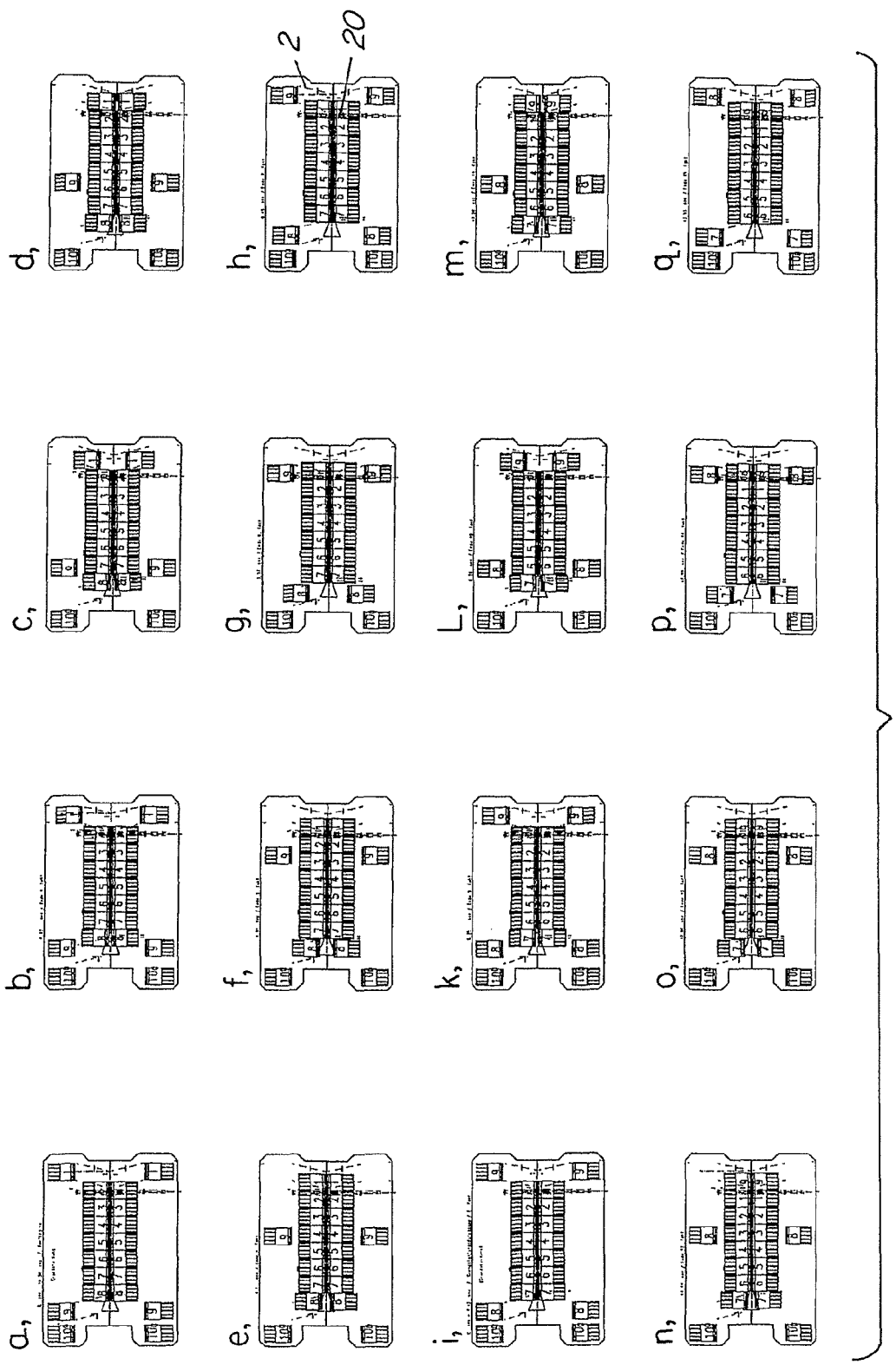
FIG. 12 shows another flow chart for the operation of a device according to an embodiment example of the invention under consideration, wherein nine mold jaws on each side are in rotation.

Another advantage of the invention under consideration is that more than one mold jaw pair can be located on the return section. This advantage is shown in FIG. 12, in comparison to FIG. 11. FIG. 11 shows the principle of the return of a mold jaw, as this is implemented, for example, with the device according to EP-A-0 636 462 also (the operating sequence can be seen in FIG. 11, line by line). Aside from the mold jaws in the park station, there are nine mold jaw pairs in FIG. 12, whereas there are only eight mold jaw pairs in circulation in FIG. 11. According to the principle shown in FIG. 12, there are two mold jaw pairs on the return section (see, for example. FIG. 12, line 1, column 1: mold jaws No. 9 and No. 1).

The advantage of the invention under consideration is evident, in particular, in a comparison of position h) in FIG. 12 (line 2, column 4) with position i) (line 3, column 1). In position h), the pinion 26 of the inlet assembly 2 is still meshed with mold jaw No. 1, so as to mesh it with the drive pinion 20 of the mold section device. At the end of position h), the pinions 26 of the inlet assembly 2 move downwards, so as to move outwards again. According to the state of the art, this would be possible only alter position k) in FIG. 12 (line 3, column 2).

In accordance with the invention, mold jaws No. 9 are already in the outer position at the beginning of the mold section (see positions h) and i)) since the pinions 26 of the inlet assembly 2 are moved outwards in the lower position and subsequently, grasp mold jaws No. 9, from below. By this parallel procedure, two or more mold jaw pairs can be on the return section according to the invention under consideration.

According to other embodiment examples of the invention under consideration, the procedure can also be carried out by a crane or a portal robot instead of a pinion return device for the return contrary to the production direction. The portal robot can also replace either the inlet or the outlet assembly in accordance with the invention, wherein at least one inlet or outlet assembly is present.

Figure 3:
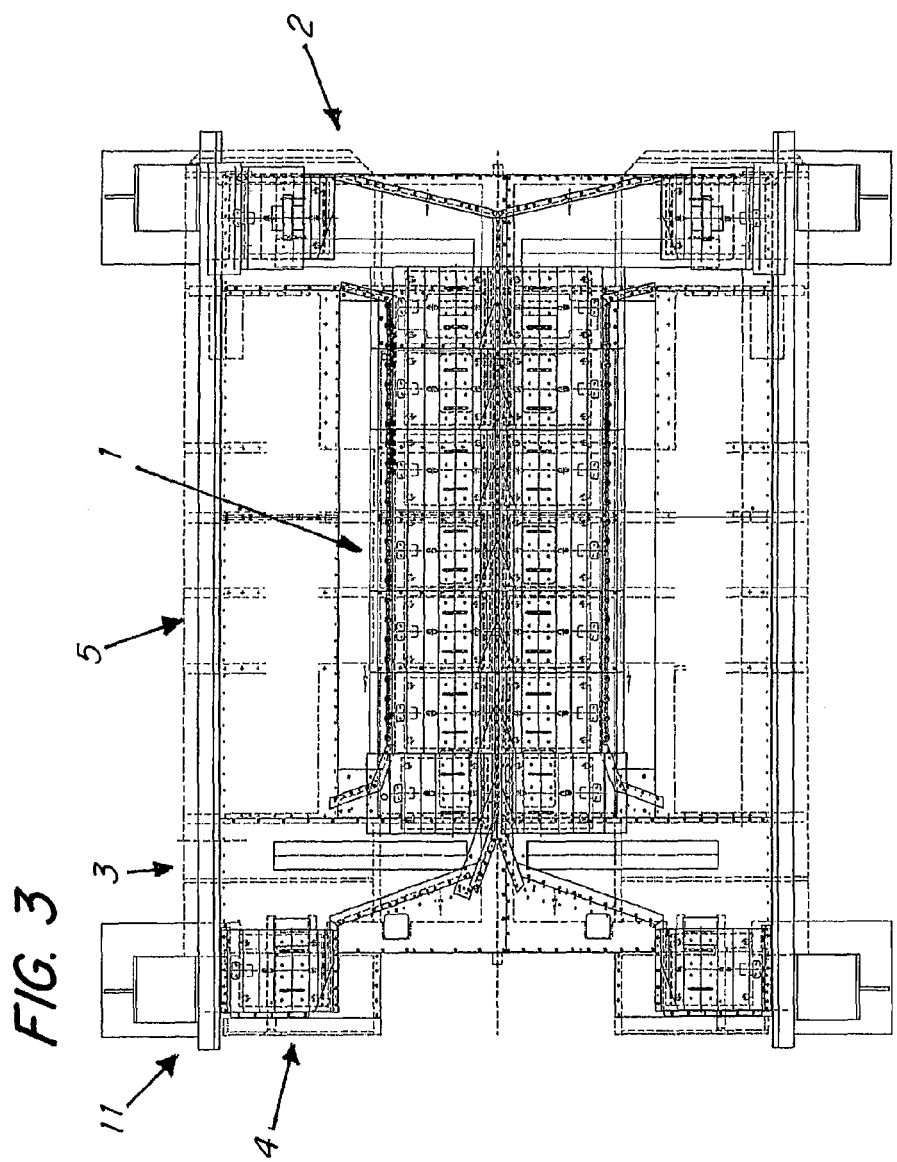
FIG. 3 shows a schematic top view of the invention according to the first embodiment example of the invention under consideration, with a longitudinal portal.
Figure 4:
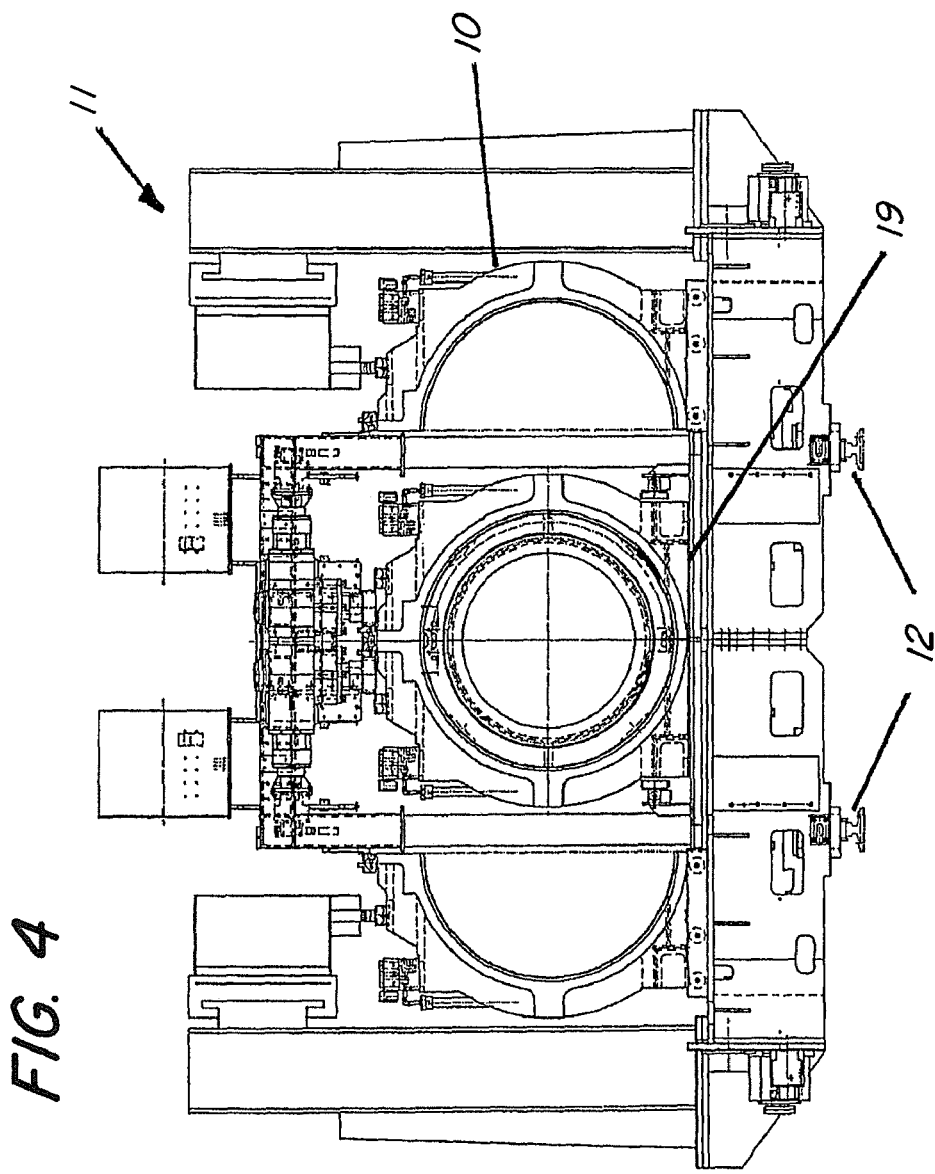
FIG. 4 shows a front view of the invention according to the first embodiment example of the invention under consideration.
Figure 5:
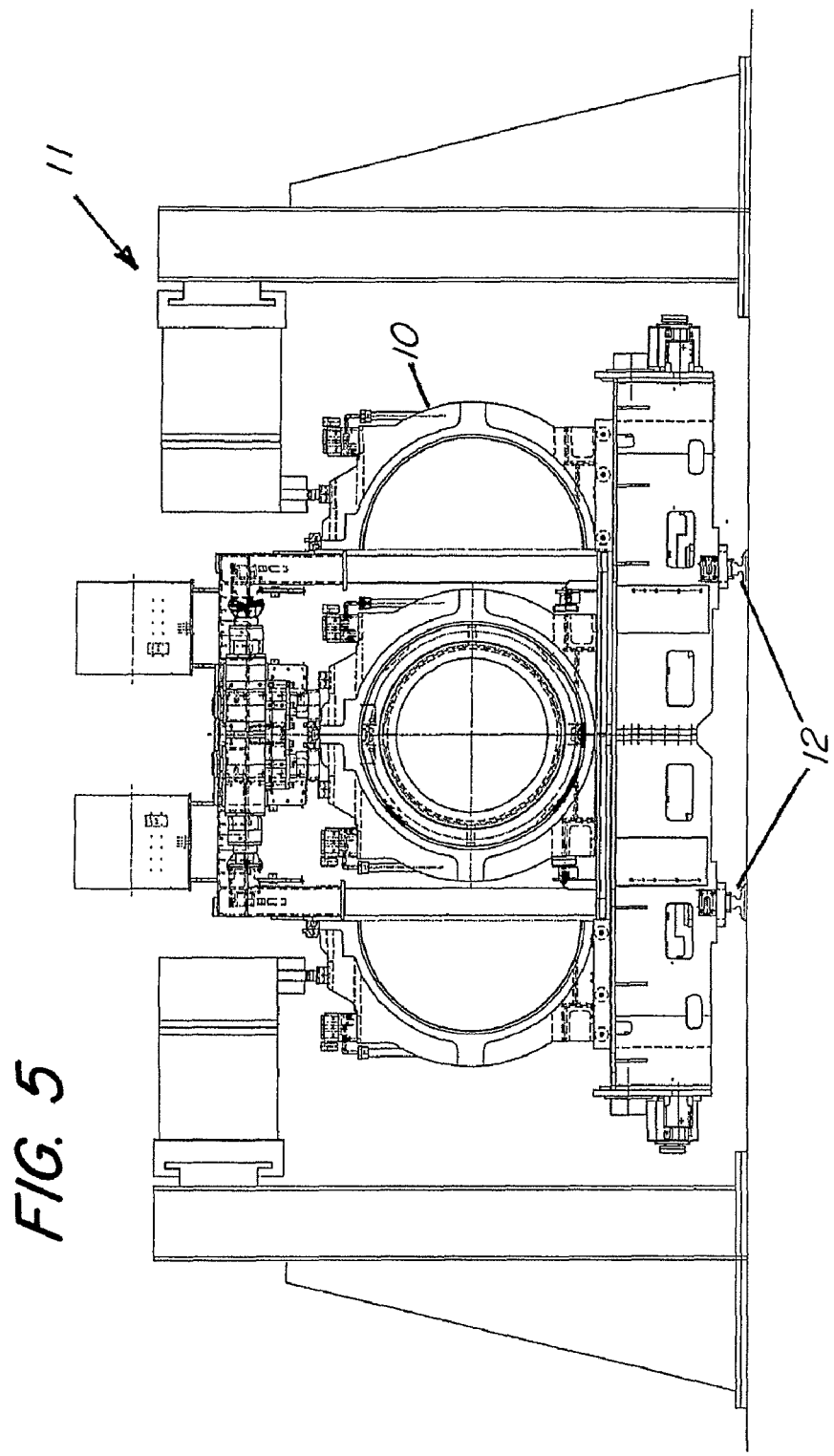
FIG. 5 shows a front view of the invention according to a second embodiment example of the invention under consideration, in which the longitudinal portal is mounted on the hall floor.

According to other embodiment examples of the invention under consideration, longitudinal portals 11 can be provided, which can be moved on tracks 12 together with the mold section device and the return device (see FIGS. 3 and 4). The longitudinal portals, however, can also be mounted directly on the floor (see FIG. 5).

Figure 8:
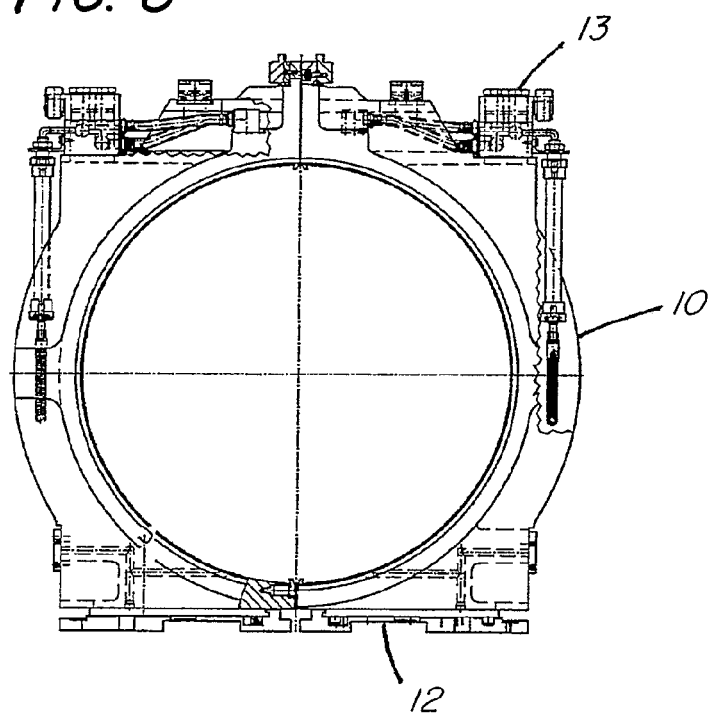
FIG. 8 shows two joined mold jaws with a large inside diameter.

FIG. 8 shows a pair of mold jaws 10, which can be used for a device for the production of corrugated pipes. A mold jaw 10 according to one embodiment has a lower toothed rack 12 for the interaction with the pinions of the mold section device and with the pinions of the inlet and outlet groups 2, 3 and the pinion return section 5. Furthermore, a connection 13 for the circulation of the cooling agent is provided, so that the thermal energy of the injected thermoplastic can be removed during the production of a corrugated pipe. The mold jaw pair can be provided for the production of corrugated pipes with an outside diameter of 1800 mm. Larger outside diameters of, for example, 2400 mm, however, are also possible.

If corrugated pipes with smaller outside diameters are to be produced with a device for the production of corrugated pipes, which is actually constructed for larger outside diameters, then the use of mold jaws 10 with inside profile inserts 15 according to the state of the art, for example, from DE 101 48 294 C1 is already known.

According to another aspect of the invention, a mold jaw 10 has at least one height adapter 30 (see FIG. 9), connected to the mold jaw. In this way, it is possible to create a height compensation if the mold jaw is used in a device for the production of corrugated pipes, which device is constructed for mold jaws for a second diameter that is larger than the first diameter, without having to undertake a height adjustment of the device for the production of corrugated pipes, in particular, of the cover frame of the device. Thus, corrugated pipes with an outside diameter of, for example, 500 mm, can be produced, although the device is actually constructed for the production of corrugated pipes with an outside diameter of 1800 mm.

The height adapter of the mold jaw in accordance with the invention advantageously has a profile insert 31, which is suitable for interacting with drive means of the mold section device of the device for the production of corrugated pipes, wherein the profile insert 31 has at least one toothed rack, which interacts with a pinion of the mold section device. In this way, it is possible to produce the height adapter from light metal, in particular, aluminum, and the profile insert from steel. To attain a reduction in weight and material, it is also advantageous for the height adapter to be at least partially hollow or to have holes 32.

With the mold jaw 10 in accordance with the invention with the height adapter 30, it is also possible to provide a connection 13 for the cooling system, which is connected to the cooling conduits of the mold jaw 10.

Figure 9:
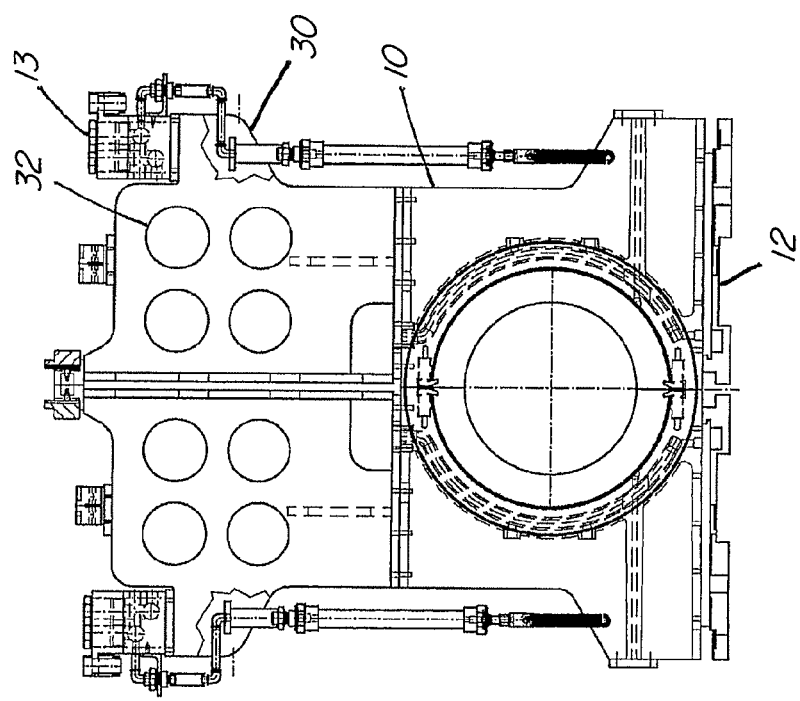
FIG. 9 shows two joined mold jaws according to an embodiment example of the invention under consideration, with a small inside diameter, wherein a height adapter with a profile insert is provided.
Figure 10:
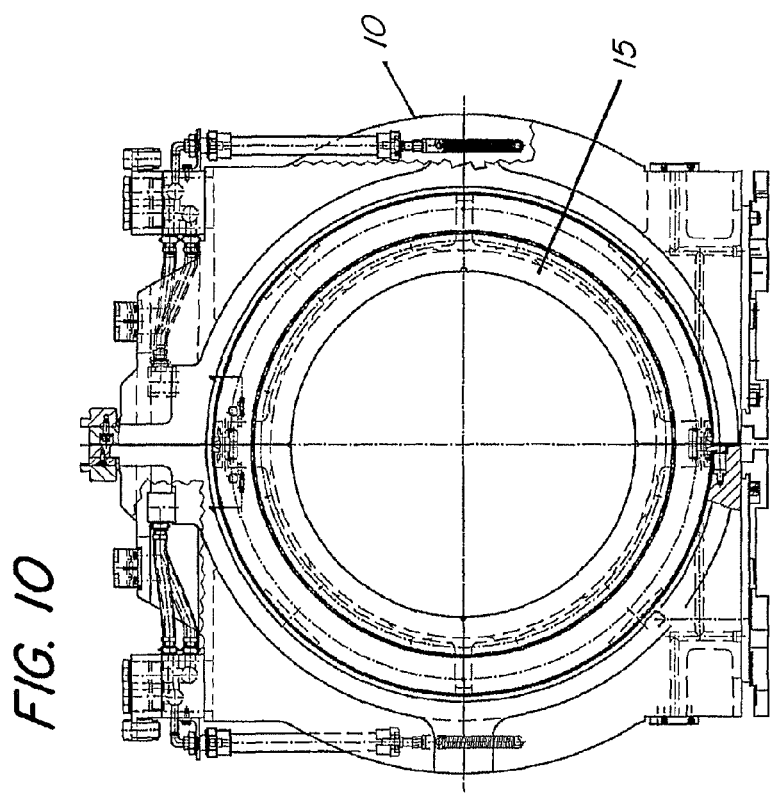
FIG. 10 shows joined mold jaws according to another embodiment example of the invention under consideration, wherein a large inside diameter of the mold jaws with profile inserts is reduced to a small inside diameter.

The height adapter is located above the mold jaw in the embodiment example shown in FIG. 9. However, it is also possible to provide two height adapters, of which one is located above the mold jaw in the operation of the mold jaw in the device for the production of corrugated pipes, and the other is located below the mold jaw. In this case, it is advantageous to provide one lower profile insert and one upper profile insert for interaction with the drive means of the mold section unit.

Accordingly, other embodiments are within the scope of the following claims.

What is claimed is:

1. A device for the production of corrugated pipes from thermoplastic, in which mold jaws, which complement each other in pairs, move together in a cycle along a mold section that leads away from an extruder head; the mold jaws being capable of being moved apart at the end of the mold section and returned to its beginning separately from one another with a mold section device for the movement of the mold jaws along the mold section, which has a supporting table with drive means for the mold jaws on the mold section, and a return conveying device for the return conveyance of the mold jaws from the end of the mold section to its beginning, which has an outlet assembly to move the mold jaws apart at the end of the mold section and/or an inlet assembly to move in the mold jaws at the beginning of the mold section, wherein the outlet assembly and/or the inlet assembly has drive means, which can be moved perpendicularly with reference to the plane of the supporting table; and characterized in that the drive means of the inlet and/or outlet assembly are supported by a holder or a frame, which has at least one knee lever mechanism.

2. The device according to claim 1, wherein the drive means of the outlet and/or inlet assembly can be moved perpendicularly with reference to the plane of the supporting table, in such a way that the drive means are disengaged from a mold jaw, which is situated in a perpendicular direction.

3. The device according to claim 1, wherein the drive means of the outlet and/or inlet assembly can be moved perpendicularly with reference to the plane of the supporting table in such a way that the center of gravity of the drive means is displaced perpendicularly, with reference to the plane of the supporting table.

4. The device according to claim 1, wherein the drive means of the outlet and/or inlet assembly drive the meshed mold jaws only parallel to the plane of the supporting table.

5. The device according to claim 1, wherein the drive means of the outlet and/or inlet assembly also have a movement component in a direction parallel to the plane of the supporting table when moved perpendicularly with reference to the plane of the supporting table.

6. The device according to claim 1, wherein the drive means of the outlet and/or inlet assembly are swiveled around an axis when moved perpendicularly with reference to the plane of the supporting table.

7. The device according to claim 1, wherein the drive means of the outlet and/or inlet assembly comprise one or more transverse conveying pinions, which are supported, in particular, on a driven spline shaft.

8. The device according to claim 7, wherein the transverse conveying pinion of the outlet and/or inlet assembly can be driven in a transverse movement.

9. The device according to claim 7, wherein each transverse conveying pinion is supported in a carriage that can be moved transversely and can be moved by a driven spindle.

10. The device according to claim 1, wherein the mold jaws have toothed racks that interact with the drive means of the outlet and/or inlet assembly or with the drive means of the mold section device.

11. The device according to claim 1, wherein the drive means of the outlet and/or inlet assembly drive the mold jaws from below.

12. The device according to claim 1, wherein in the area of the knee of the knee lever mechanism, a linear actuation mechanism, in particular, a pneumatic cylinder, acts on the knee lever mechanism, so as to bring about a swiveling of the holder or the frame.

13. The device according to claim 1, wherein the drive means of the outlet and/or inlet assembly comprise one or more transverse conveying pinions, and wherein a rotation axis of a motor for the rotation of the one or more transverse conveying pinions and/or the rotation axis of a motor for the transverse displacement of the one or more transverse conveying pinions coincide with the rotation axis of the holder or the frame.

14. The device according to claim 1, wherein the return of the mold jaws takes place by return sections with interacting drive pinions contrary to the production direction on both sides of the mold section.

15. The device according to claim 1, wherein the return of the mold jaws is carried out with at least one portal robot or crane contrary to the production direction.

16. The device according to claim 15, wherein the portal robot or crane moves out the mold jaws at the end of the mold section; subsequently, it returns them contrary to the production direction; and in that the portal robot or crane transfers the mold jaws to the inlet assembly, at the beginning of the mold section, and the inlet assembly moves the mold jaws into the mold section.

17. The device according to claim 15, wherein the outlet assembly is provided to move out the mold jaws; and in that the portal robot or crane returns the mold jaws contrary to the production direction and subsequently moves them into the mold section.

18. The device according to claim 1, wherein the mold section drive has lower and upper drive means for the mold jaws on the mold section.

19. A device for the production of corrugated pipes from thermoplastic, in which mold jaws, which complement each other in pairs, move together in a cycle along a mold section that leads away from an extruder head; the mold jaws being capable of being moved apart at the end of the mold section and returned to its beginning separately from one another with a mold section device for the movement of the mold jaws along the mold section, which has a supporting table with drive means for the mold jaws on the mold section, and a return conveying device for the return conveyance of the mold jaws from the end of the mold section to its beginning, which has an outlet assembly to move the mold jaws apart at the end of the mold section and/or an inlet assembly to move in the mold jaws at the beginning of the mold section, characterized in that the outlet assembly and/or the inlet assembly has drive means, which can be moved perpendicularly with reference to the plane of the supporting table, characterized in that the drive means of the inlet and/or outlet assembly are supported by a holder or a frame, which can be adjusted via a scissors-type lever mechanism or a parallelogram lever mechanism, perpendicularly, with reference to the plane of the supporting table.

* * * * *